United States Patent
Reinecke et al.

(10) Patent No.: US 10,080,329 B2
(45) Date of Patent: Sep. 25, 2018

(54) SIDE SHAKER LINK FOR AGRICULTURAL HARVESTER SIEVE ASSEMBLY

(71) Applicant: CNH Industrial America LLC, New Holland, PA (US)

(72) Inventors: Clay A. Reinecke, Blue Grass, IA (US); Tyler L. Nelson, Rochester, MN (US); Craig E. Murray, Davenport, IA (US); Kevin S. Schwinn, Orion, IL (US); Justin L. Montenguise, Bettendorf, IA (US); Jishan Jin, Naperville, IL (US); Kai Zhao, Willowbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 54 days.

(21) Appl. No.: 15/218,525

(22) Filed: Jul. 25, 2016

(65) Prior Publication Data
US 2017/0020074 A1    Jan. 26, 2017

Related U.S. Application Data

(60) Provisional application No. 62/196,221, filed on Jul. 23, 2015.

(51) Int. Cl.
| *A01F 12/32* | (2006.01) |
| *B07B 1/00* | (2006.01) |
| *A01F 12/44* | (2006.01) |
| *A01F 7/06* | (2006.01) |
(Continued)

(52) U.S. Cl.
CPC .............. *A01F 12/448* (2013.01); *A01F 7/06* (2013.01); *A01F 12/46* (2013.01); *A01F 12/60* (2013.01)

(58) Field of Classification Search
CPC ...... A01F 12/448; A01F 12/44; A01F 12/446; A01F 12/56; A01D 75/282; B07B 1/28
See application file for complete search history.

(56) References Cited

U.S. PATENT DOCUMENTS

| 757,307 A | 4/1904 | Hill |
| 2,939,581 A * | 6/1960 | Ashton .................. A01F 12/44 |
| | | 209/26 |

(Continued)

FOREIGN PATENT DOCUMENTS

| EP | 569798 A1 | 9/1998 |
| EP | 1609352 A1 | 12/2005 |
| EP | 1932420 A1 | 6/2008 |

OTHER PUBLICATIONS

European Search Report; 16181013.0/1656; dated Nov. 29, 2016.

*Primary Examiner* — Arpad Fabian-Kovacs
(74) *Attorney, Agent, or Firm* — Patrick M. Sheldrake

(57) ABSTRACT

An agricultural harvester includes a grain processing section having a sieve assembly. The sieve assembly is connected to mechanism for producing a side to side oscillation by a single cast structural link having an input through slotted openings to the drive mechanism to accommodate misalignment. The link has vertical and horizontal flanges connected to a main body for interconnection between the right and left frames and structural supports interconnecting the right and left frames. The main body of the link extends through a slot in a rubber wall to accommodate the movement and seal against loss of grain.

8 Claims, 6 Drawing Sheets

(51) Int. Cl.
 *A01F 12/46* (2006.01)
 *A01F 12/60* (2006.01)

(56) References Cited

U.S. PATENT DOCUMENTS

| | | | | |
|---|---|---|---|---|
| 4,355,647 | A * | 10/1982 | Heidjann | A01D 75/282 460/101 |
| 4,598,718 | A * | 7/1986 | Glaubitz | A01D 75/282 209/416 |
| 4,770,190 | A * | 9/1988 | Barnett | A01F 12/446 209/394 |
| 4,897,072 | A | 1/1990 | Bestland | |
| 6,632,136 | B2 | 10/2003 | Anderson et al. | |
| 6,830,155 | B2 | 12/2004 | Trench et al. | |
| 7,927,199 | B2 * | 4/2011 | Adamson | A01D 75/282 460/101 |
| 8,622,792 | B1 * | 1/2014 | Murray | A01F 12/448 460/101 |
| 8,939,829 | B2 | 1/2015 | Murray et al. | |
| 9,258,945 | B2 | 2/2016 | Pearson et al. | |
| 9,288,944 | B2 | 3/2016 | Coppinger et al. | |
| 9,457,381 | B2 * | 10/2016 | Gordon | B07B 1/28 |
| 2002/0195377 | A1 * | 12/2002 | Trench | B07B 1/284 209/365.1 |
| 2003/0186731 | A1 * | 10/2003 | Voss | A01F 12/448 460/101 |
| 2005/0282601 | A1 * | 12/2005 | Duquesne | A01D 75/282 460/101 |
| 2006/0249219 | A1 * | 11/2006 | Vanderjeugt | D03C 3/36 139/87 |
| 2008/0318650 | A1 * | 12/2008 | Dhont | A01D 75/282 460/101 |
| 2014/0171163 | A1 * | 6/2014 | Murray | A01F 12/448 460/101 |

* cited by examiner

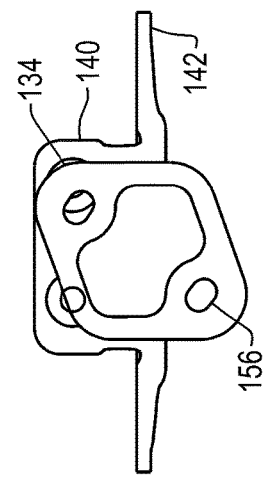
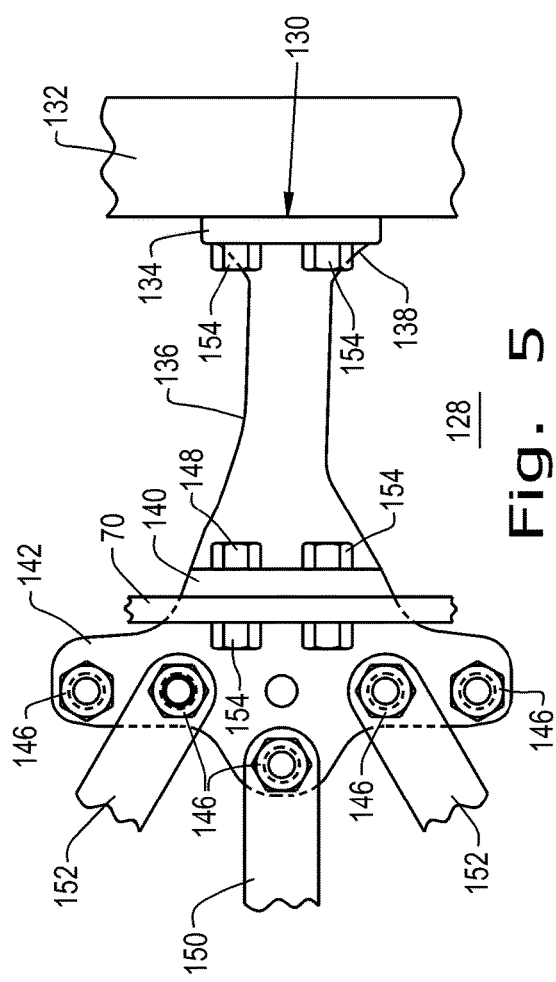
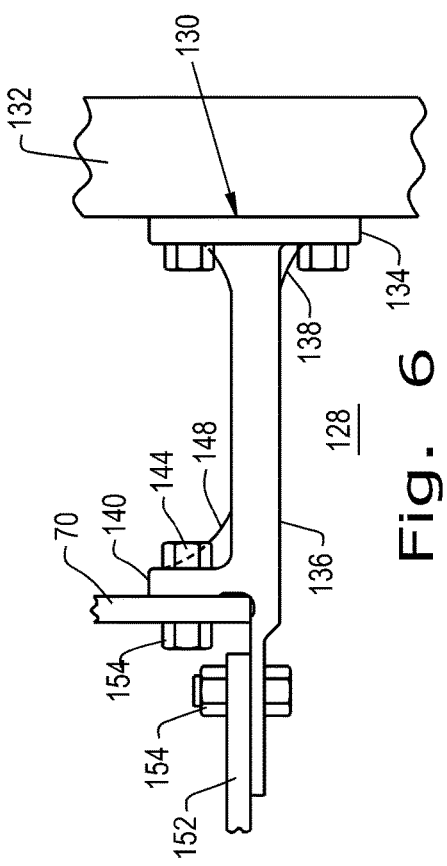

SIDE SHAKER LINK FOR AGRICULTURAL HARVESTER SIEVE ASSEMBLY

CROSS REFERENCE TO RELATED APPLICATIONS

This is a non-provisional application based upon U.S. provisional patent application Ser. No. 62/196,221, entitled "SIDE SHAKER LINK FOR AGRICULTURAL HARVESTER SIEVE ASSEMBLY", filed Jul. 23, 2015, which is incorporated herein by reference.

BACKGROUND OF THE INVENTION

1. Field of the Invention

The present invention relates to agricultural harvesters such as combines, and, more particularly, to sieve assemblies incorporated in the harvester crop processing section.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve or sieve assembly assembly) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve or sieve assembly are discharged at the rear of the combine. Grain falling through the lower sieve lands on a bottom pan of the cleaning system, where it is conveyed forwardly toward a clean grain auger.

The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

The sieve assembly usually incorporates right and left side frame members interconnected to support a sieve between the two and is supported for driven fore and aft oscillation. This moves the coarser non-grain material towards the aft end of the sieve assembly and allows agricultural crop material to fall through for collection. When the combine or agricultural harvester is operating on a side slope it is necessary to supplement the fore and aft oscillation of the sieve assembly with a side to side movement. In order to simplify the actuation mechanism the side to side movement is transmitted to the right and left frames through a single input point. This causes significant imposes high cyclical loads on the point. In the past such a link has been formed from sheet metal. The use of such metal can have a reduction of long term integrity due to high cycle fatigue.

Accordingly what is needed in the art is a single structural interconnection for the right and left rails of a sieve assembly.

SUMMARY OF THE INVENTION

The present invention seeks to provide a strong structural interconnection to a sieve assembly to permit sideways movement of the sieve assembly.

In one form, the invention is a sieve assembly for an agricultural harvester, said sieve assembly including right and left frame members interconnected by a cross member. A mechanism is connected to the right and left cross members for driving fore and aft oscillation and permitting side to side movement. A mechanism is provided for driving side to side movement of the right and left frame members. A link is structurally connected to one of the right and left frame members, the link being cast and having a single input for driving side to side movement, a structural mounting for the one of right and left frame members, and a plurality of mounting points for support frames extending between the one of first and second frames and the other of the frame members.

In another form, the invention is an agricultural harvester including a main frame, a plurality of wheels for ground movement and grain processing equipment mounted in the frame. A sieve assembly is positioned to receive material from the grain processing equipment and includes right and left frame members interconnected by a cross member. A mechanism is provided for driving the right and left frames into fore and aft oscillation and permitting side to side movement. A mechanism is provided for driving side to side movement of the right and left frame members. A link is structurally connected to one of the right and left frame members, the link being cast and having a single input for driving side to side movement, a structural mounting to the one of the right and left frame members and a plurality of mounting points for structural frames extending between the one of the first and second frames and the other of the frame members.

An advantage of the present invention is a single link connecting sieve assembly side frames with structural integrity.

Another advantage of the present invention is that the link may be cast to provide more direct stress flow paths between the input and the interconnection with the frame members.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 5 is a plan view of a link incorporated in the sieve assembly of FIGS. 2 and 3;

FIG. 6 is a side view of the link illustrated in FIG. 5;

FIG. 7 is an end view of the link illustrated in FIG. 5; and,

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
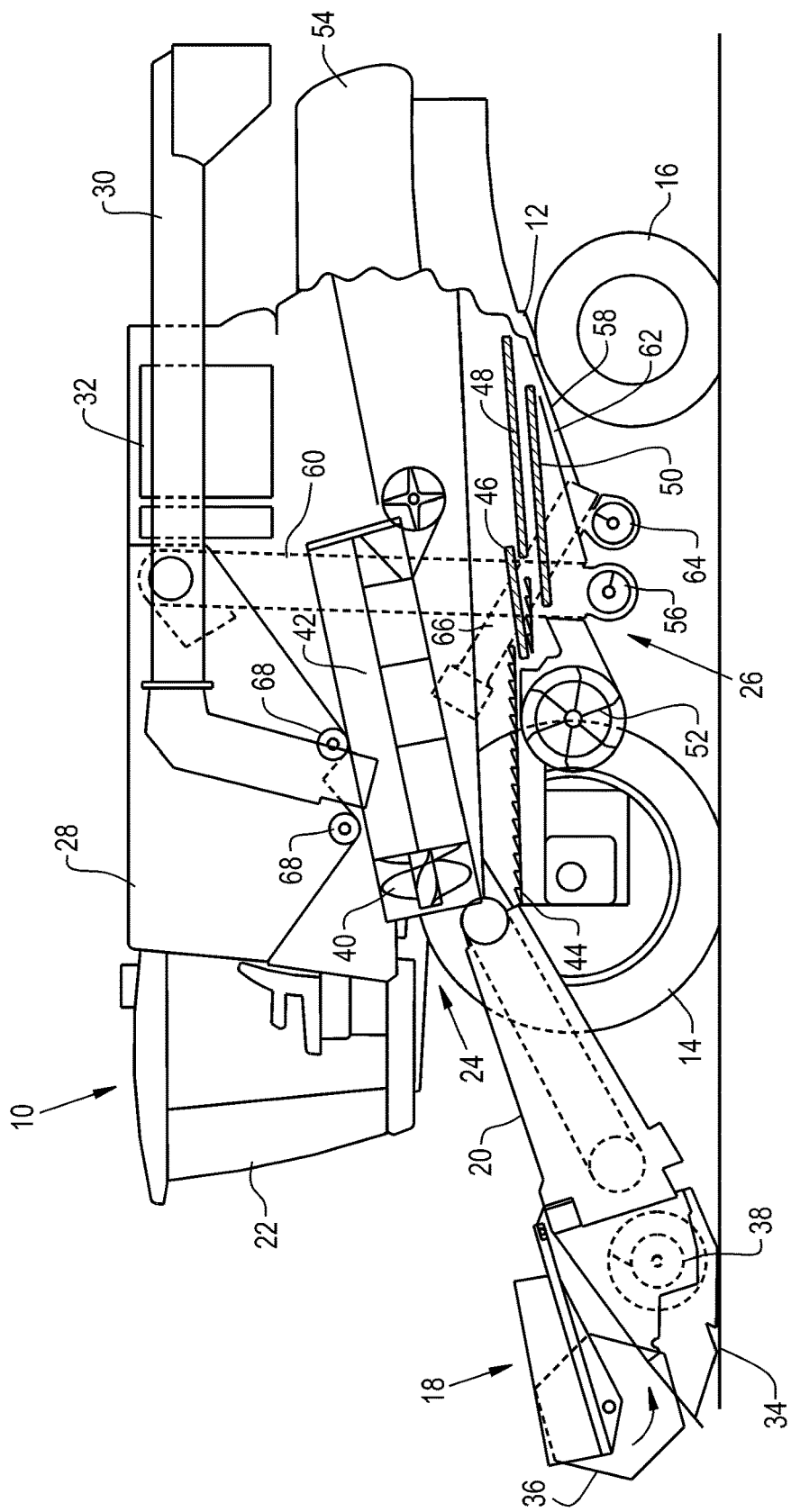
FIG. 1 is a side view of an embodiment of an agricultural harvester in the form of a combine which may include a sieve assembly of the present invention.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan or auger bed 44 and is conveyed toward cleaning system 26. Cleaning system 26 may include an optional pre-cleaning sieve 46, an upper sieve 48 (also known as a chaffer sieve or sieve assembly), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44, if present, and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger or return elevator 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Figure 2:
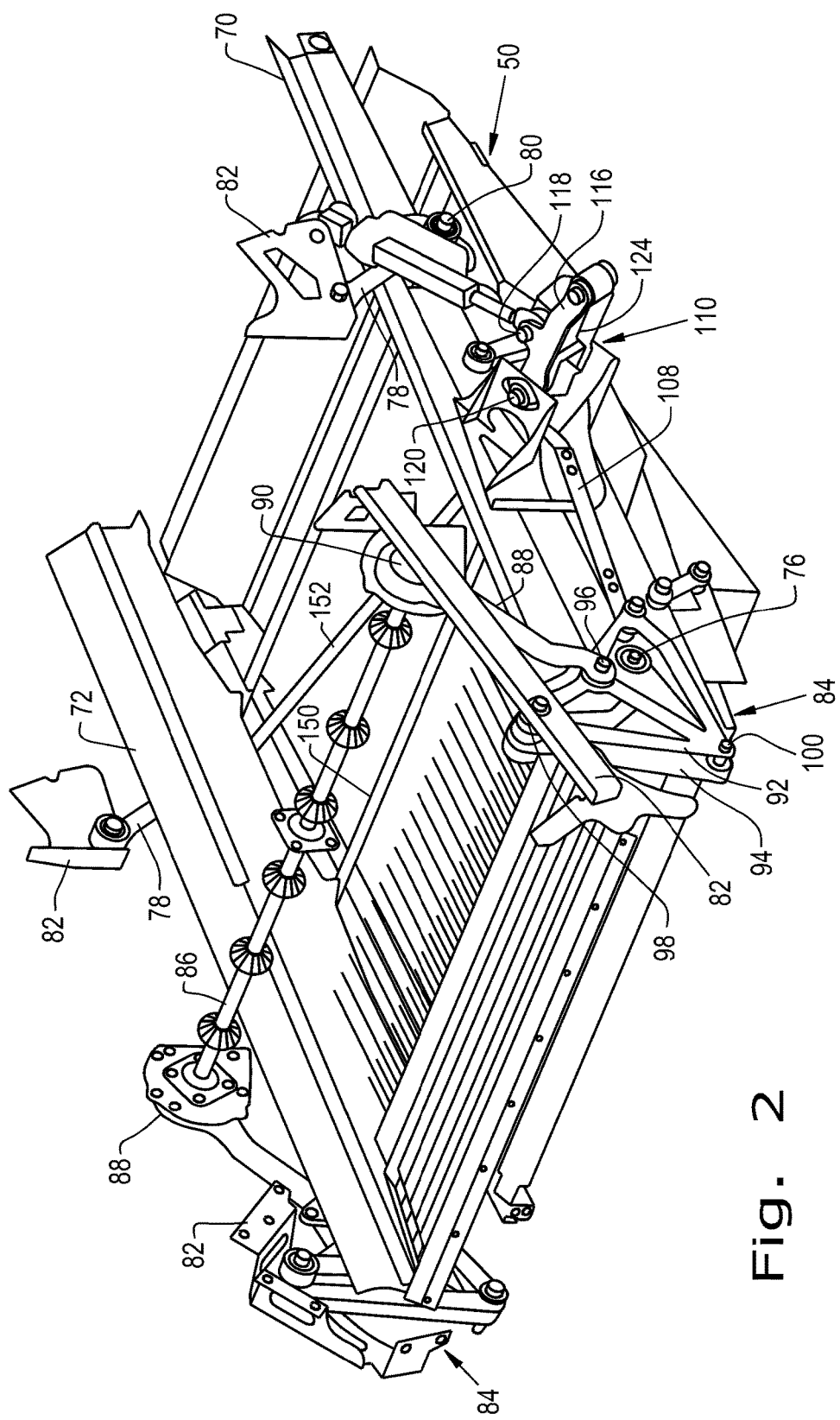
FIG. 2 is a perspective view of the sieve assembly incorporated in FIG. 1.

Referring now to FIG. 2, the upper and lower sieves or sieve assemblies 48 and 50 are shown. The upper sieve assembly 48 includes a left rail or frame 70 and a right rail or frame 72 interconnected by a cross frame 74. The right and left frames 70 and 72 are supported at the cross frame 74 by a front pivot support 76. A flexible link 78 connects to a rear support to maintain the rear of the rails in place.

Figure 3:
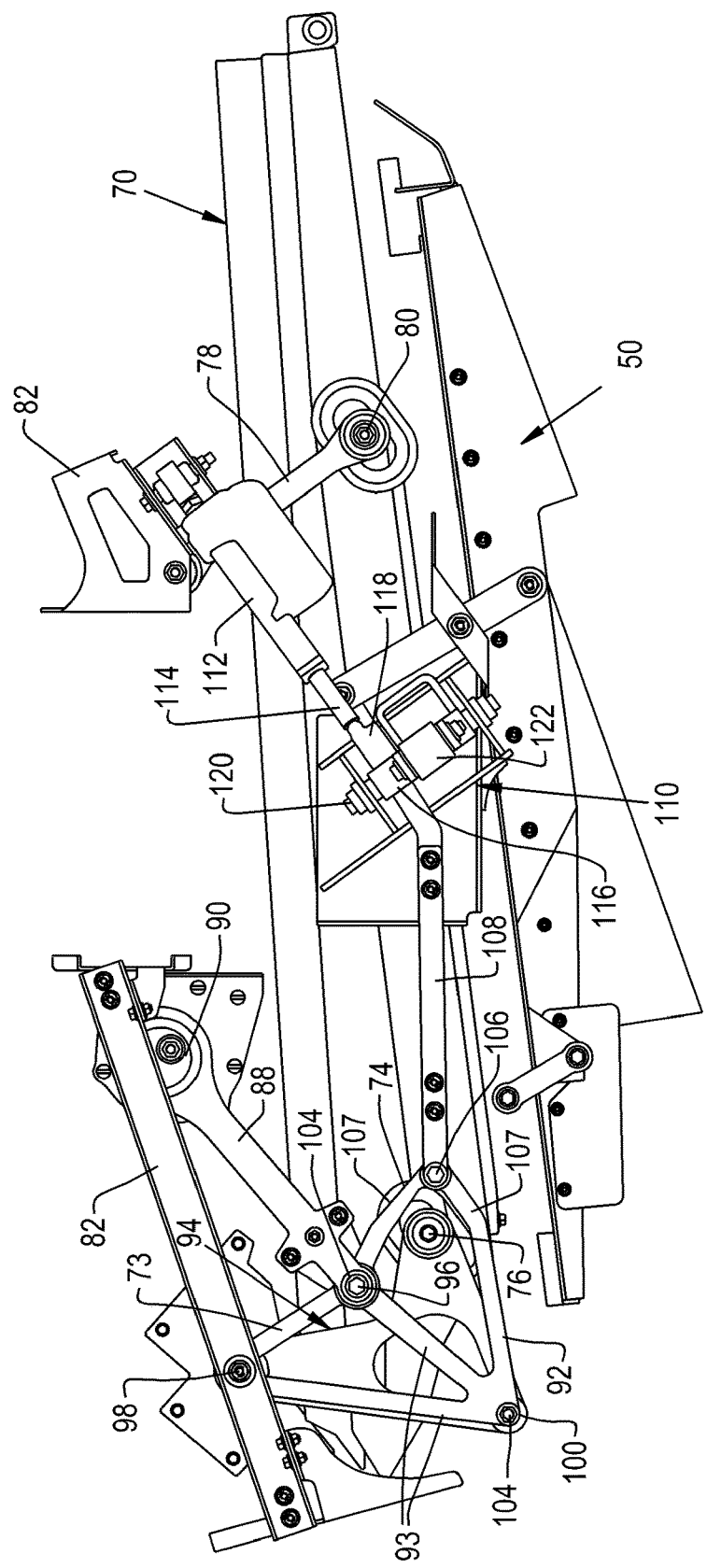
FIG. 3 is a side view of the sieve assembly of FIG. 2.
Figure 4:
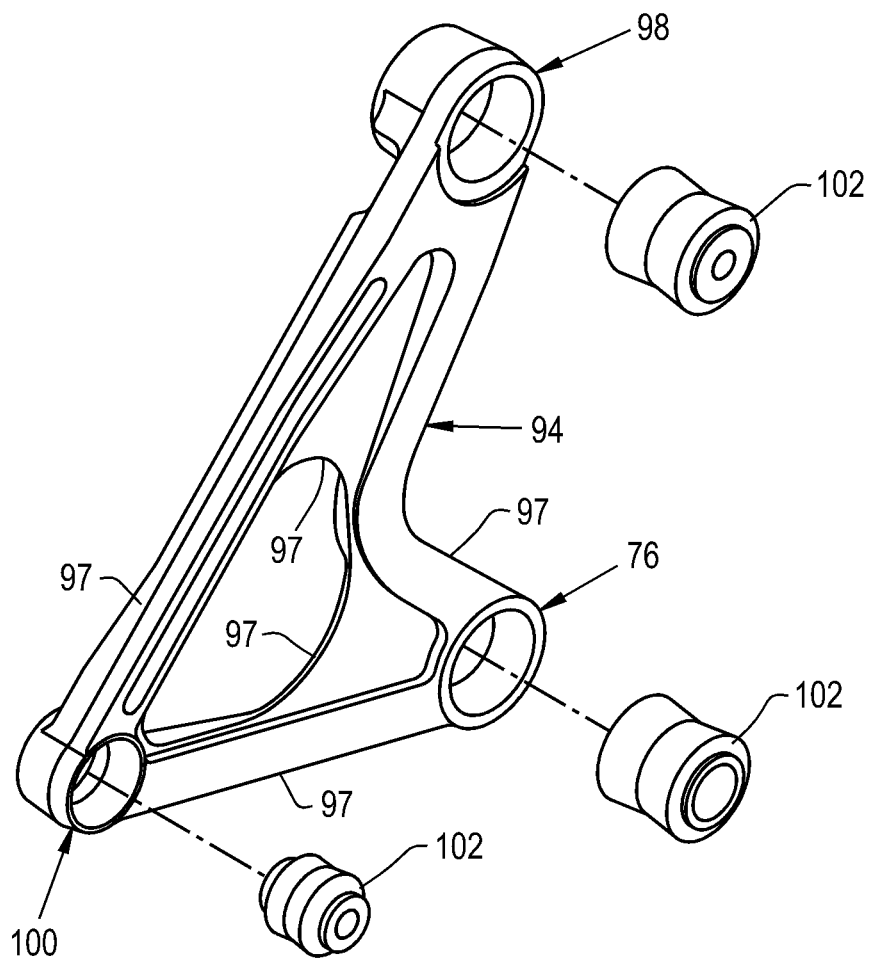
FIG. 4 is an individual view of a support linkage for the sieve assembly of FIGS. 1 and 2.

Support frames 82 each provide a base affixed to the chassis 12 to provide ultimate support for the pans. The front of the right and left frames are mounted for fore and aft movement through a fore and aft oscillation mechanism generally indicated at 84. An input drive shaft 86, extending transverse in chassis 12, receives a suitable power input for rotation. Both ends of drive shaft 86 drive oscillating arms 88 through an eccentric mounting 90. Each arm 88 connects to a first frame 92 through a pivotal connection 96. A pivotal mounting 98 supported by frame 82 mounts the first triangular frame 92 and the second triangular frame 94 adjacent to it radially inward from the first triangular frame 94. A frame interconnection 100 connects the first and second frames 92 and 94. The second frame 94 has a plurality of flexible rubber bushings 102 as shown particularly in FIG. 4. A plurality of rubber bushings 104, particularly shown in FIG. 3, enables an interconnection between the first and second triangular frames 92 and 94.

A pivotal connection 106 on first frame 92 connects with a link 108 that drives the lower sieve 50 for reciprocating movement. Details of this arrangement are not included to enable a better focus on the invention.

The right and left frames 70 and 72 are selectively reciprocated from side to side by a side shaker mechanism generally indicated at 110. The mechanism 110 includes a reciprocating electric actuator 112 appropriately mounted to frame 82 and having an output shaft 114 connecting to an upper link 116 by a pivotal input connection 118. The upper and lower links 116 are pivotally connected to the frame 82 at 120. A bushing 122, integral with a connecting rod 124, connects the links 116 to a structural connection with the right and left frames 70 and 72 to be described below.

Referring now to FIGS. 5 and 6, a structural link 128 has an input end 130 for connection to a universal joint 132 that is in turn connected to links 116. Input end 130 has an input flange 134 integral with a main body 136. An integral fillet 138 connects the main body 136 to the input flange 134. A frame vertical mounting flange 140 is positioned at one end of the main body 136 and is positioned at right angles to a frame horizontal mounting flange 142. A plurality of mounting holes 144 in the frame vertical mounting flange 140 is provided and a plurality of mounting holes 146 are formed in the frame horizontal mounting flange 142. A fillet 148 interconnects the frame vertical mounting flange 140 with the main by 136. As illustrated in both FIGS. 5, 6 and 2, a support tube 150 extends from a central opening 146 in the frame horizontal mounting flange 142 to the opposite frame (frame 72) to provide a structural interconnection. Support tubes 152 extend from openings 146 adjacent the central opening at an angle to the structural link 128 and fan out to spaced points on the right frame 72 as particularly shown in FIG. 2.

As shown particularly in FIG. 7, the flange 138, 134 has elongated holes 156 to accommodate variations in positioning of the right and left frames 70 and 72 with respect to the mechanism for producing the side to side linkage. The elongated slots 156 permit a range of angles so that, as installed, there are no side forces or other inputs on a universal joint 132.

Figure 8:
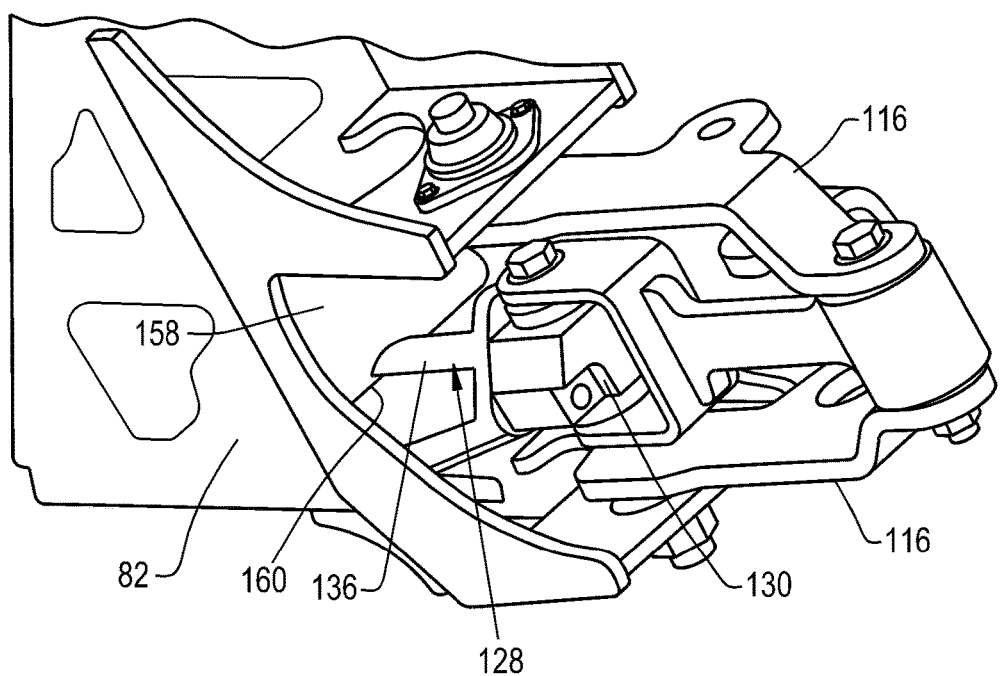
FIG. 8 is a perspective view of the link illustrated in FIG. 5, as installed.

As shown particularly in FIG. 8, the main body 136 of the structural link 128 extends through a flexible wall 158 mounted to frame elements 82 to form a barrier between the mechanism producing the side to side movement and the left frame 70. The main body 136 extends through a slot 160 in the rubber wall 158. The rubber wall 158 may be in two pieces or a single piece with a slot formed in it. In either case, the connection allows for a side to side movement and also forward and aft movement while sealing the area for escape of grain and material from the sieve assemblies.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sieve assembly for an agricultural harvester, said sieve assembly comprising:
   right and left side frames interconnected by at least a cross frame at one end thereof;
   a mechanism for driving said right and left frames in fore and aft movement and permitting side to side movement;
   a mechanism for driving said right and left frames in side to side movement;
   a link structurally connected to one of said right and left frames, said link being cast and having a single input for driving side to side movement, a structural mounting for said one of right and left frames, and a plurality of mounting points for support frames extending between said one of said first and second frames and the other of said frame members, and
   wherein said link comprises a main body having a horizontal flange extending therefrom and a vertical flange interconnected with said horizontal flange at a right angle for connection with one of said right and left frames, and said vertical flange has holes therein for fastening to one of said frames and said horizontal frame has a plurality of holes for fastening to said one of said right and left frames and to said support frames, and further wherein said support frames are tubular, and a center of said tubes extends perpendicularly across and between said right and left frames and adjacent tubular supports extend at an angle from said link.

2. The sieve assembly as claimed in claim 1, further comprising a fillet formed between said main body and said vertical flange.

3. The sieve assembly as claimed in claim 1, wherein said vertical input flange has elongated slots formed therein for permitting adjustment of said link during installation to prevent misalignment stresses.

4. An agricultural harvester comprising:
   a chassis;
   a plurality of wheels for ground movement;
   grain processing equipment mounted in said chassis;
   a sieve assembly having right and left side frames interconnected by a cross member at the front thereof;
   a mechanism for driving said right and left frames in fore and aft oscillation and permitting side to side movement;
   a mechanism for driving side to side movement;
   a link structurally connected to one of said right and left side frames, said link being cast and having a single input for driving side to side, a structural mounting to said one of right and left frame members and a plurality of mounting points for support frames extending between said one of said right and left side frames and the other of said frames, and wherein said link comprises a main body having a vertical flange for connecting to said frame member and an integral horizontal flange extending therefrom, and further comprising holes in the vertical flange for connecting to said one of said right and left frames and holes in the horizontal flange for connecting to one of said right and left frames and to said support frames, and further wherein said support frames are tubular in form and a center of said tubular support frames extends perpendicularly between said right and left frames and tubular support frames on either side of said center tube extend at an angle thereof.

5. The agricultural harvester as claimed in claim 4, wherein said input flange has elongated slots for accommodating misalignment upon installation of said link.

6. The agricultural harvester as claimed in claim 4, further comprising a rubber wall mounted to said chassis and having a slot therein through which said link extends to sealingly permit side to side movement and fore and aft oscillation of said right and left side frames.

7. The agricultural harvester as claimed in claim 6, wherein said rubber wall is formed from one of a single sheet with a slot in it and two sheets abutting to form a slot.

8. A sieve assembly for an agricultural harvester, said sieve assembly comprising:
   right and left side frames interconnected by at least a cross frame at one end thereof;
   a mechanism for driving said right and left frames in fore and aft movement and permitting side to side movement;
   a plurality of elongated support frames;
   a mechanism for driving said right and left frames in side to side movement;
   a link structurally connected to one of said right and left frames, said link being cast and having a single input for driving side to side movement, a structural mounting for said one of right and left frames, and a plurality of mounting points for said support frames extending between said one of said first and second frames and the other of said frame members; and,
   wherein said link comprises a main body having a horizontal flange extending therefrom and a vertical flange interconnected with said horizontal flange at a right angle for connection with one of said right and left frames, and said vertical flange has holes therein for fastening to one of said frames and said horizontal frame has a plurality of holes for fastening to said one of said right and left frames and to said support frames, wherein a center one of said support frames extends generally perpendicularly across and between said right and left frames and adjacent support frames extend at an angle.

* * * * *